United States Patent [19]

Kruse

[11] Patent Number: 5,503,243
[45] Date of Patent: Apr. 2, 1996

[54] RELEASIBLE COUPLING MECHANISM FOR COMPONENTS OF A PERSONAL MOBILITY VEHICLE

[75] Inventor: Thomas E. Kruse, Sarasota, Fla.

[73] Assignee: Merits Health Products Co., Ltd., Taichung, Taiwan

[21] Appl. No.: 335,121

[22] Filed: Nov. 7, 1994

[51] Int. Cl.[6] .............................. B62D 61/08; B62K 15/00
[52] U.S. Cl. .......................................... 180/208; 180/216
[58] Field of Search ...................................... 180/208, 907, 180/216, 215, 210, 65.1, 11, 15, 16; 280/287, DIG. 5

[56] References Cited

U.S. PATENT DOCUMENTS

| | | | |
|---|---|---|---|
| 2,216,697 | 10/1940 | Vossenberg | 180/11 |
| 2,671,673 | 3/1954 | Benson . | |
| 4,570,739 | 2/1986 | Kramer | 180/208 |
| 4,666,008 | 5/1987 | Shepard et al. | 180/907 |
| 4,708,219 | 11/1987 | Cresswell | 180/208 |
| 4,750,578 | 6/1988 | Brandenfels | 180/208 |
| 4,757,868 | 7/1988 | Cresswell | 180/208 |
| 4,834,409 | 5/1989 | Kramer | 180/907 |
| 4,861,058 | 8/1989 | Cresswell | 180/208 |
| 4,944,359 | 7/1990 | Doman et al. | 180/208 |
| 4,947,955 | 8/1990 | Hopely, Jr. | 180/208 |
| 5,101,920 | 4/1992 | Peterson | 180/208 |
| 5,150,762 | 9/1992 | Stegeman et al. | 180/208 |
| 5,154,251 | 10/1992 | Fought | 180/208 |
| 5,228,533 | 7/1993 | Mitchell | 180/208 |
| 5,318,144 | 7/1994 | Berlinger, Jr. | 180/208 |
| 5,333,702 | 8/1994 | Gaffney et al. | 180/208 |

FOREIGN PATENT DOCUMENTS

| | | | |
|---|---|---|---|
| 2133358 | 7/1984 | United Kingdom | 180/907 |

*Primary Examiner*—Margaret A. Focarino
*Assistant Examiner*—Peter C. English
*Attorney, Agent, or Firm*—Charles J. Prescott

[57] ABSTRACT

A self-propelled personal mobility vehicle and frame therefor and method of assembly of the dismantled vehicle. The frame includes a front support for a steerable wheel and a coupling member connected to a rear portion of the frame which is releasibly engagable with a drive assembly operably positioned immediately rearward of the frame. The drive assembly includes a centrally positioned drive gear housing having a transversely extending tubular drive shaft housing and spaced rear support wheels operably connected at each end of the drive shaft housing for supporting and propelling the vehicle. The coupling member is releasibly engaged over the drive shaft housing by first lifting the rear of the frame with the drive assembly resting on the ground. The frame is then moved diagonally rearwardly or toward the drive assembly and downwardly so that, when fully engaged over and upon the drive shaft housing, the coupling member, by frame and vehicle weight alone, prevents further lateral and fore and aft (e.g. all linear movement) between the frame and the drive assembly. The drive assembly may then be rotated about the rear wheels and drive shaft housing from an independent at-rest position into locked, operable position and automatically releasibly secured by a lock and latch arrangement.

3 Claims, 8 Drawing Sheets

RELEASIBLE COUPLING MECHANISM FOR COMPONENTS OF A PERSONAL MOBILITY VEHICLE

BACKGROUND OF THE INVENTION

1. Scope of the Invention

This invention relates generally to personal mobility vehicles, and more particularly to a self-propelled personal mobility vehicle and frame therefor which may be quickly dismantled and reassembled for transport or use as desired.

2. Prior Art

Three wheeled or tricycle-style self-propelled personal mobility vehicles have become extremely popular recently. Such vehicles are rapidly becoming very commonplace for transporting a handicapped or physically impaired person within the home, throughout shopping centers and elsewhere.

Because these personal mobility vehicles are useful in many settings, they have become more compact and typically incorporate features which facilitate dismantling of the vehicle for transport. Although some automobiles have been equipped with small bumper hitch-type trailers which facilitate loading the personal mobility vehicle directly thereinto without dismantling, the vast majority of such personal mobility vehicles are normally taken apart by breaking them down into their major components and loading them into the trunk of an automobile for transport.

A portion of one such compact self-propelled personal mobility vehicle is shown in FIG. 1 and FIG. 2 and further described in the Detailed Description section. The portion of this prior art vehicle shown represents the rear drive assembly separated from the rear of the frame in FIG. 1 and operably connected thereto in FIG. 2. Although applicant's invention incorporates a rear drive assembly including a transaxle similar to this prior art device, by applicant's invention, the dismantling and reassembly is made considerably more convenient and secure.

The following U.S. and foreign patents are representative of other prior art personal mobility vehicles of a less similar nature:

| | |
|---|---|
| Benson | 2,671,673 |
| Kramer | 4,570,739 |
| Shepard | 4,666,008 |
| Cresswell | 4,708,219 |
| Brandenfels | 4,750,578 |
| Cresswell | 4,757,868 |
| Kramer | 4,834,409 |
| Cresswell | 4,861,058 |
| Doman | 4,944,349 |
| Hopely Jr. | 4,947,955 |
| Peterson | 5,101,920 |
| United Kingdom | 2133358A |

The present invention provides a self-propelled personal mobility vehicle, frame therefor and method of assembly which not only adds increased strength and rigidity to the interengagement between the two major components or assemblies, but also renders the assembly and dismantling thereof considerably easier, even for a one-handed elderly user.

BRIEF SUMMARY OF THE INVENTION

This invention is directed to a self-propelled personal mobility vehicle and frame therefor and method of assembly of the dismantled vehicle. The frame includes a front support for a steerable wheel and a coupling member connected to a rear portion of the frame which is releasibly engagable with a drive assembly operably positioned immediately rearward of the frame. The drive assembly includes a centrally positioned drive gear housing having a transversely extending tubular drive shaft housing and spaced rear support wheels operably connected at each end of the drive shaft housing for supporting and propelling the vehicle. The coupling member is releasibly engaged over the drive shaft housing by first lifting the rear of the frame with the drive assembly resting on the ground. The frame is then moved diagonally rearwardly or toward the drive assembly and downwardly so that, when fully engaged over and upon the drive shaft housing, the coupling member, by frame and vehicle weight alone, prevents further lateral and fore and aft (e.g. all linear movement) between the frame and the drive assembly. The drive assembly may then be rotated about the rear wheels and drive shaft housing from an independent at-rest position into locked, operable position and automatically releasibly secured by a lock and latch arrangement.

It is therefore an object of this invention to provide a self-propelled personal mobility vehicle having a uniquely configured frame which is easily assemblable with respect to a separate rear drive assembly and easily dismantlable therefrom.

It is yet another object of this invention to provide a frame for a self-propelled personal mobility vehicle which offers added strength in interconnection with a rear drive assembly of a personal mobility vehicle while also offering enhanced assemblability, even by one-handed operation.

It is yet another object of this invention to provide a method for assembling a frame of a self-propelled personal mobility vehicle with its associated rear drive assembly.

In accordance with these and other objects which will become apparent hereinafter, the instant invention will now be described with reference to the accompanying drawings.

DETAILED DESCRIPTION OF THE INVENTION

PRIOR ART

Figure 1:
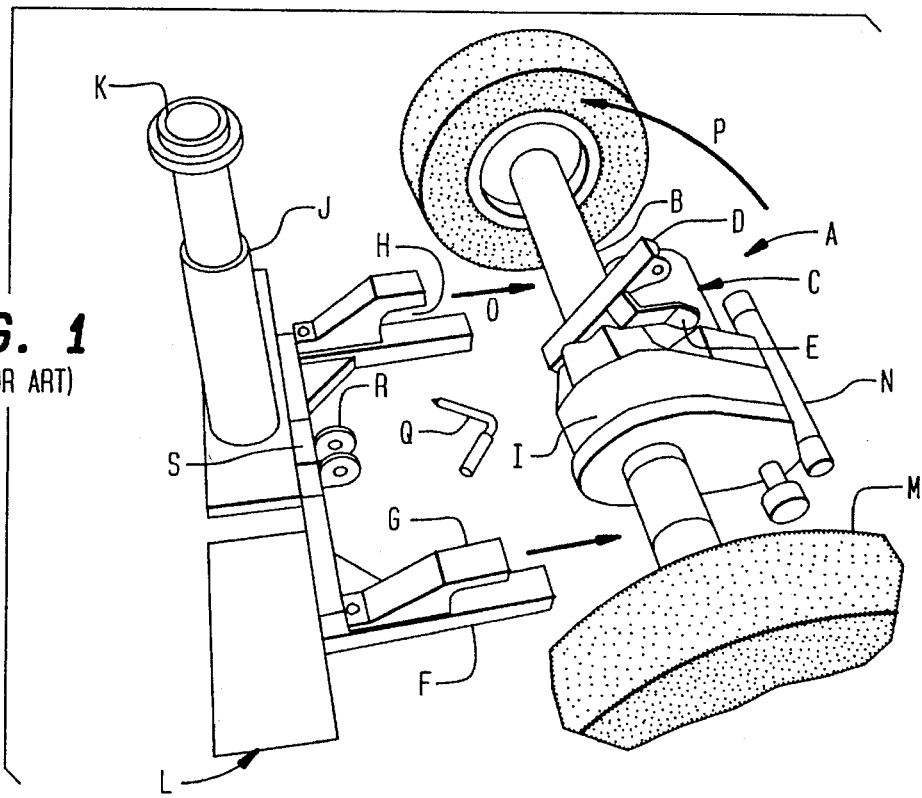
FIG. 1 is a perspective view of a rear portion of a frame of a prior art personal mobility vehicle separated from the rear drive assembly of the vehicle.
Figure 2:
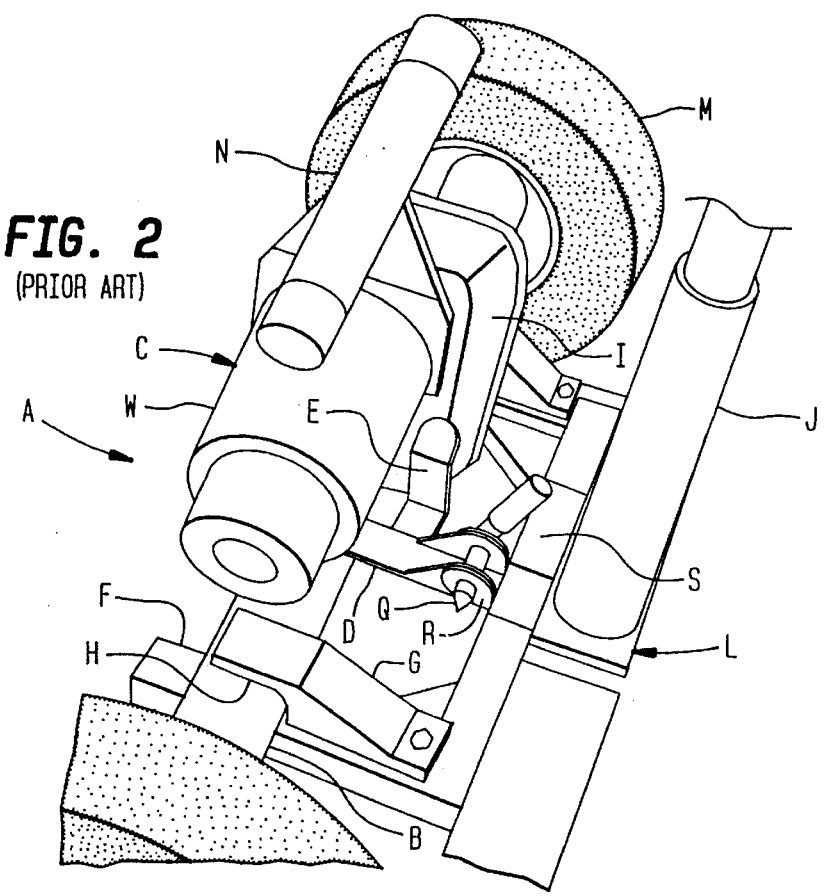
FIG. 2 is a perspective view of FIG. 1 in its assembled configuration.

Referring now to the drawings, and particularly to FIGS. 1 and 2, a prior art device is there depicted generally at letter A and includes a rear drive assembly C and a frame L. The frame L, fabricated of conventional welded steel tubing construction, includes an upright tubular support post J for slidably receiving a pedestal mount K for a seat thereatop (not shown). The frame L also includes rearwardly extending spaced frame portions F atop which are bolted die-cast support brackets G which define a rearwardly facing opening or slot H. A support block S, having a centrally positioned clevis R, is also provided on the rearward portion of frame L.

The rear drive assembly C includes a drive gear housing I centrally positioned with respect to transversely extending tubular drive shaft housing B. An electric drive motor W is operably connected to the drive gear housing I as best seen in FIG. 2. Spaced rear wheels M operably connected at each end of the drive shaft housing B are operably mounted for rolling support of the personal mobility vehicle and for being rotatably driven by an internal drive shaft contained therewithin (not shown).

To assemble these two major components, the frame L and the rear drive assembly C, the rear drive assembly C is rested atop the ground or a flat surface as shown in FIG. 1. The frame L is then moved rearwardly in the direction of arrow 0 until the drive shaft housing B is fully engaged into openings H. Thereafter, the rear drive assembly C is rotated in the direction of arrow P by grasping and lifting handle N. When the rear drive assembly C is rotated through approximately 90°, locking bracket D will be aligned within clevis R, after which a locking pin Q is slidably engagable through mating holes in these interengaged members R and D. Handle E facilitates starting rotation in the opposition direction for dismantling.

In practical operation, this prior art device is somewhat cumbersome for an individual to dismantle and reassemble. Because openings H face rearwardly with horizontal support surfaces, there is virtually no stability provided to resist separation between brackets G and drive shaft housing B until pin Q is in proper position. Thus, any misalignment or jiggling of the respective components L and C could likely result in the inadvertent disengagement of drive shaft housing B from openings H. When this occurs, the rear end of frame L will simply fall to the ground which could injure a user's feet or hands. Further, during operation, only pin Q within mating holes in clevis R and bracket D transmits fore-and-aft driving forces between the frame L and the rear drive assembly C. Any slop in fit will result in looseness, clunking noise, and further peening wear.

THE INVENTION

Figure 3:
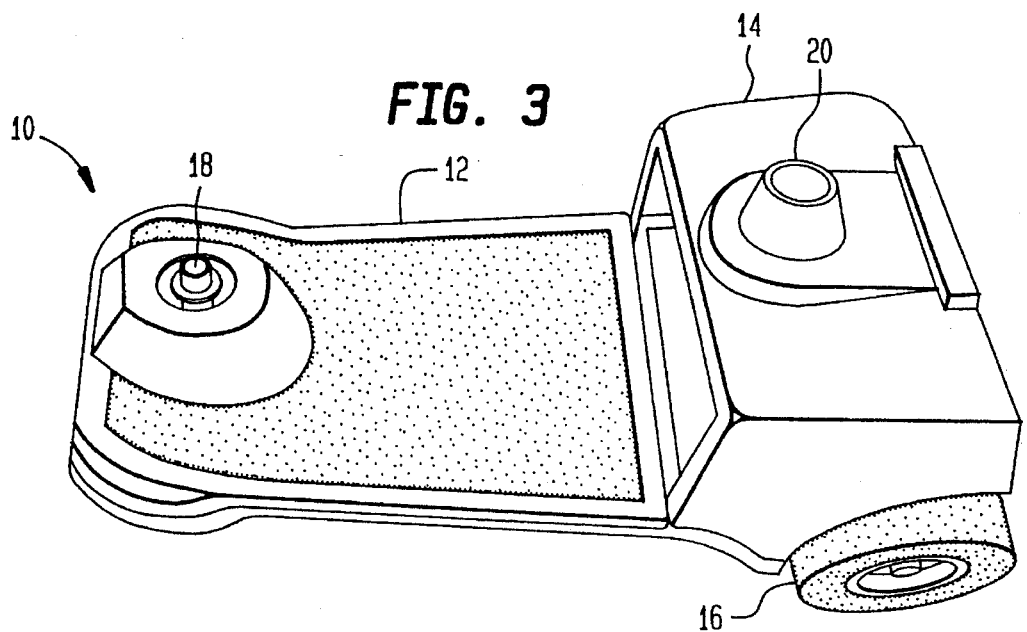
FIG. 3 is a perspective view of the assembled frame of the present invention having a removable two-part decorative shroud installed thereover.
Figure 4:
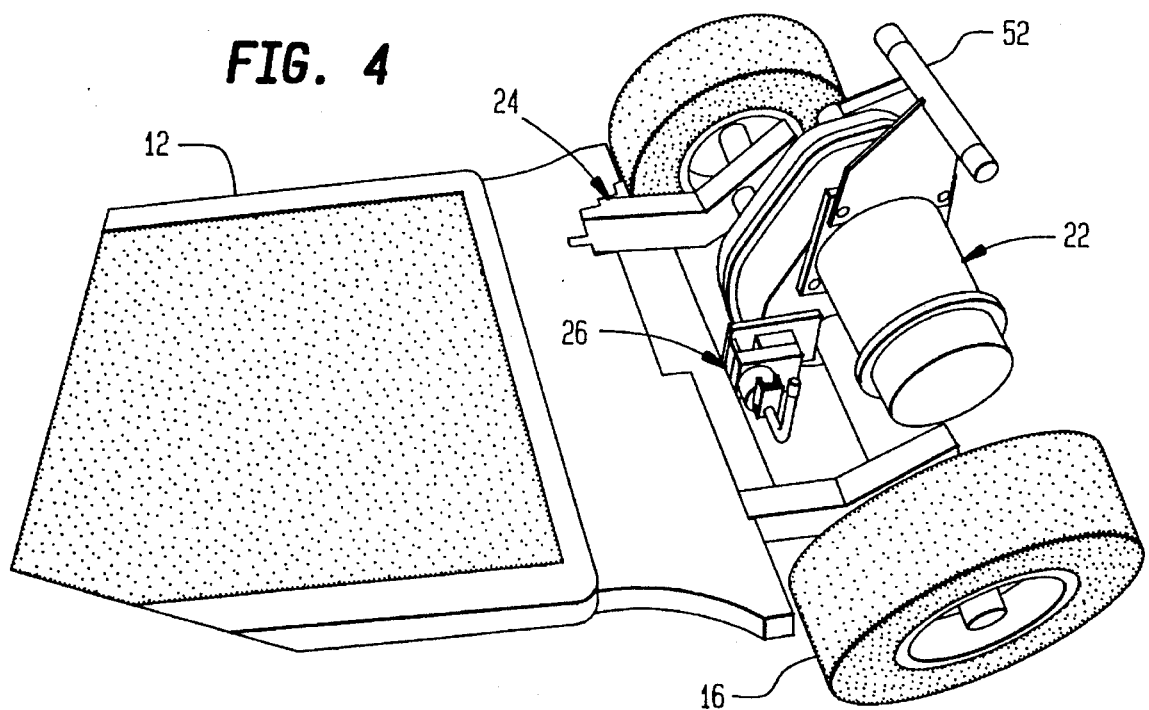
FIG. 4 is a perspective view of FIG. 3 with the rear drive assembly shroud removed.

Referring now to FIGS. 3 and 4, the invention is embodied in the assembled personal mobility chassis shown generally at numeral 10. This chassis 10 includes a molded fiberglass deck 12 which protectively and decoratively covers a tubular frame 24 described further in detail herebelow. A steering shaft 18 upwardly extends to receive a steering handle (not shown) to directionally control the vehicle by proper orientation of a centrally positioned front wheel (not shown). A molded fiberglass rear deck cover 14 lockably interengages over the rear drive assembly 22 and also provides a molded boot 20 for decoratively and protectively engaging around a seat pedestal connected to the rear of the frame in a fashion similar to the FIG. 1 prior art device at S.

Figure 5:
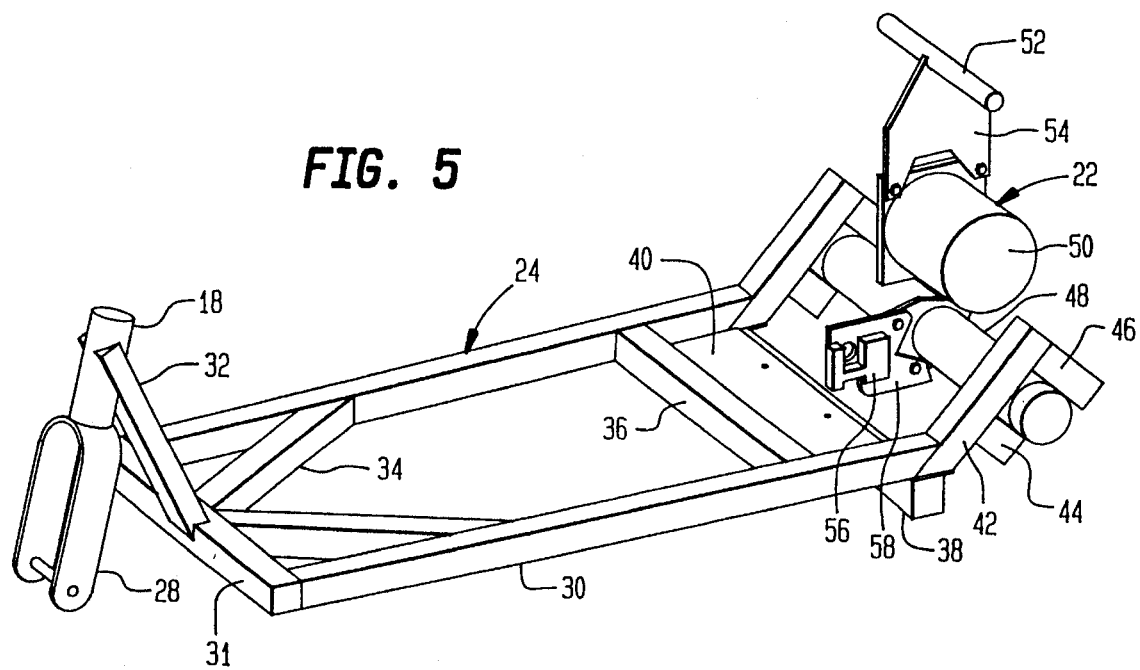
FIG. 5 is a perspective schematic view of the frame of the present invention assembled to a rear drive assembly with a portion of the locking mechanism removed for clarity.
Figure 6:
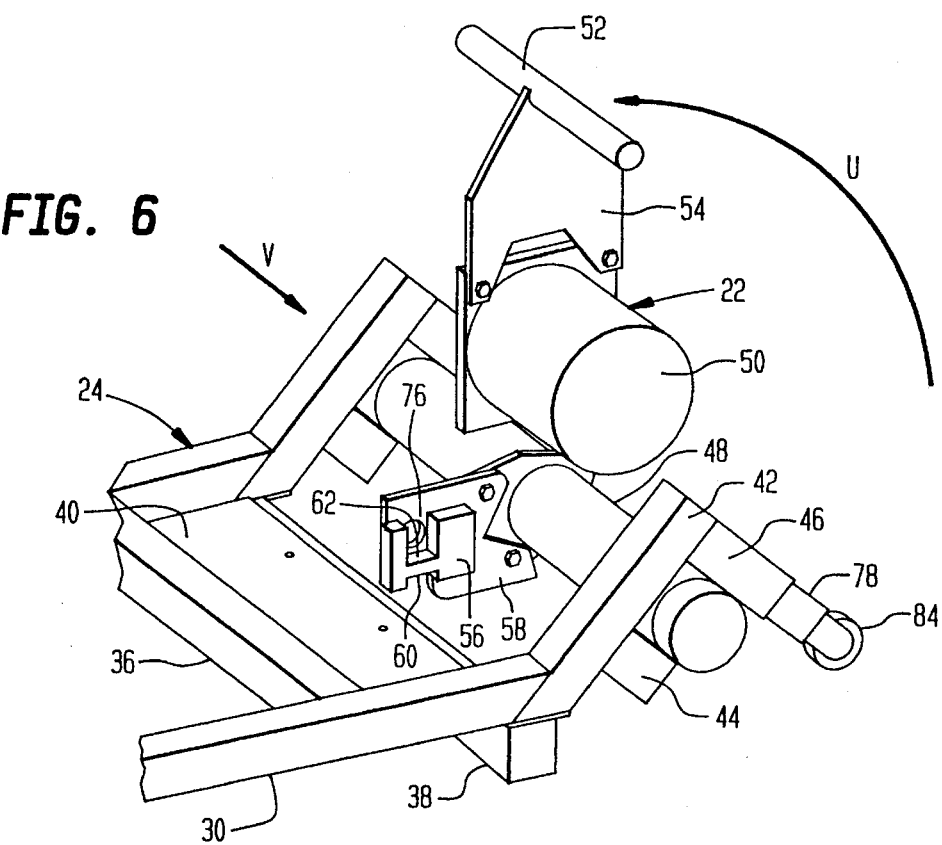
FIG. 6 is an enlarged view of FIG. 5.

Referring additionally to FIGS. 5 and 6, the frame shown generally at 24 is of a tubular perimeter type having spaced longitudinal side members 30 rigidly interconnected by cross members 31, 36 and 38 and equipment support plate 40. Additional diagonal bracing 34 strengthens the front region of the frame 24 and further prevents twisting and parallelogram-type movement. A tubular steering handle support 18 supported by braces 32 rotatably supports a steering and front wheel mounting fork 28.

The rear drive assembly 22 is schematically depicted showing the electric motor 50, excluding the drive gear housing 64 shown in FIGS. 7 to 12 described herebelow. Tubular drive shaft housing 48 extends transversely from the drive gear housing to support two spaced rear support wheels and also includes a lifting handle support plate 54 and transversely positioned lifting handle 52. The rear drive assembly 22 further includes a latch plate 56 rigidly interconnected and centrally positioned with respect thereto by support plate 58. This latch plate 56 includes a bolt striker surface 60 of arcuate configuration, and a latch locking surface 62 defined at the bottom of bolt clearance slot 76. The co-acting function of this latch plate 56 with a locking bolt will be described herebelow.

Also in FIG. 6 is shown an anti-tip roller 84 rotatably mounted in fork 78 which, in turn, is slidably securable in tubular guide 46.

Figure 7:
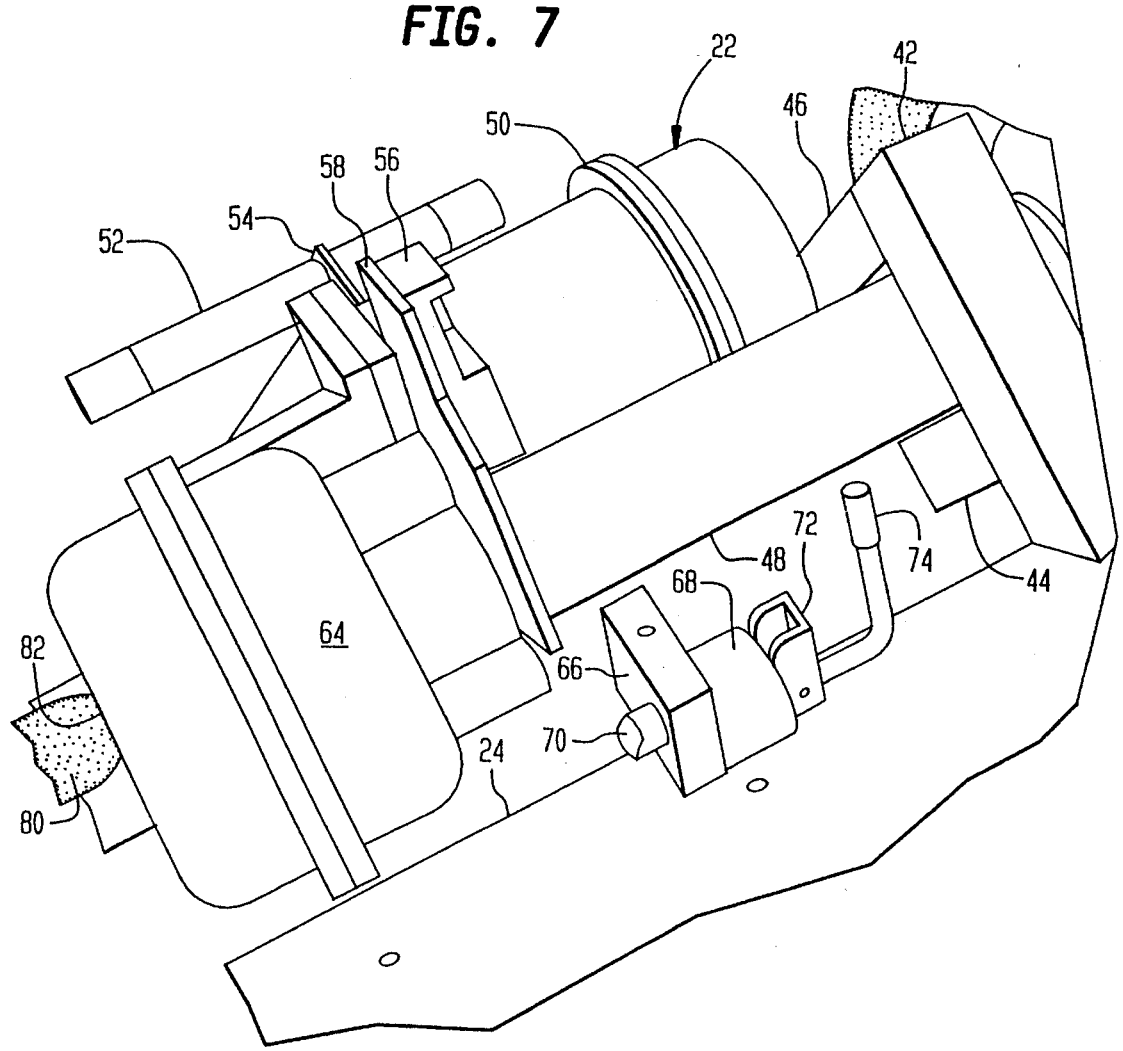
FIG. 7 is a perspective view of the rear of the frame of the present invention partially assembled to the rear drive assembly.
Figure 8:
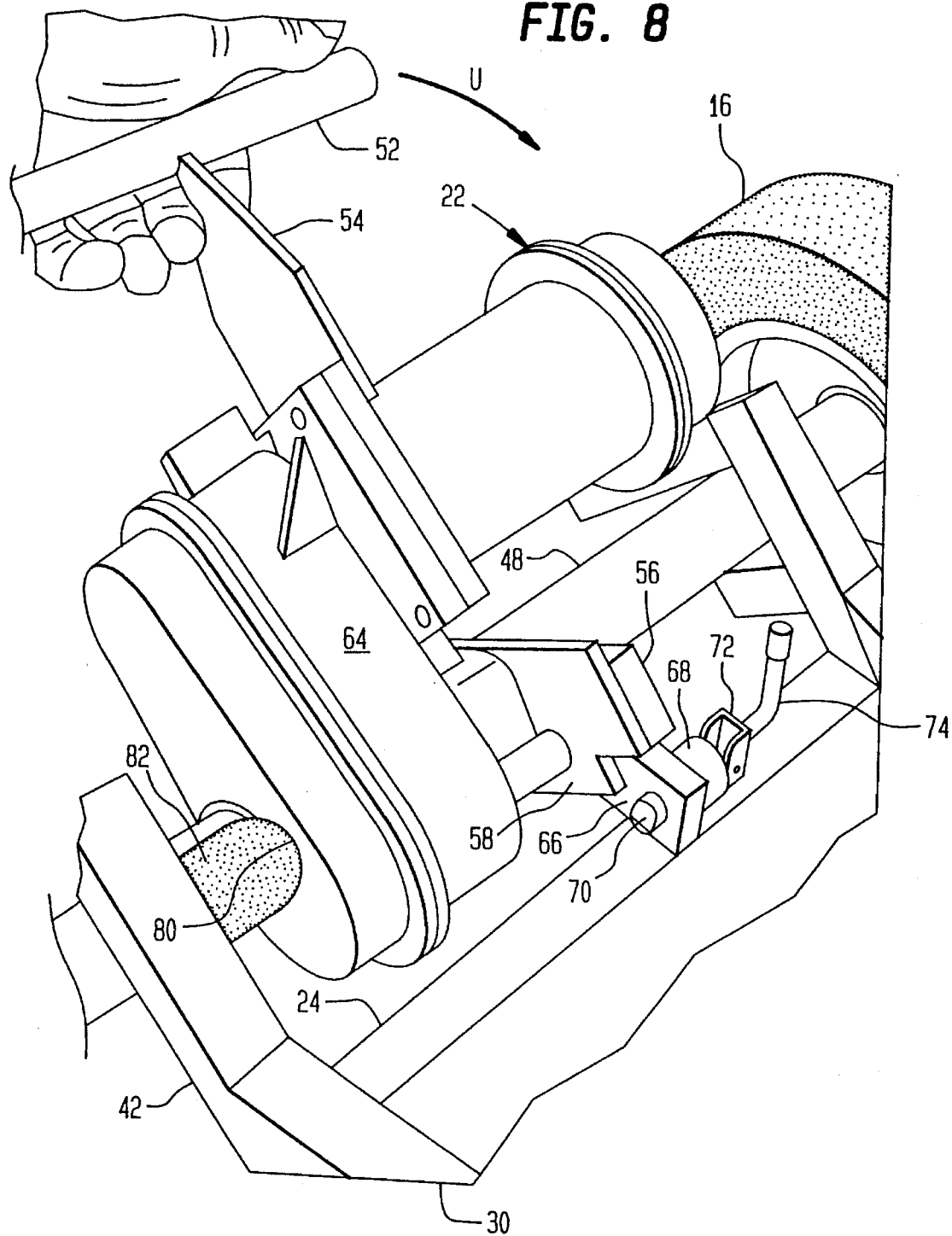
FIG. 8 is a perspective view similar to FIG. 7 showing the final rotational only movement of the drive assembly in progress toward full locking engagement.
Figure 9:
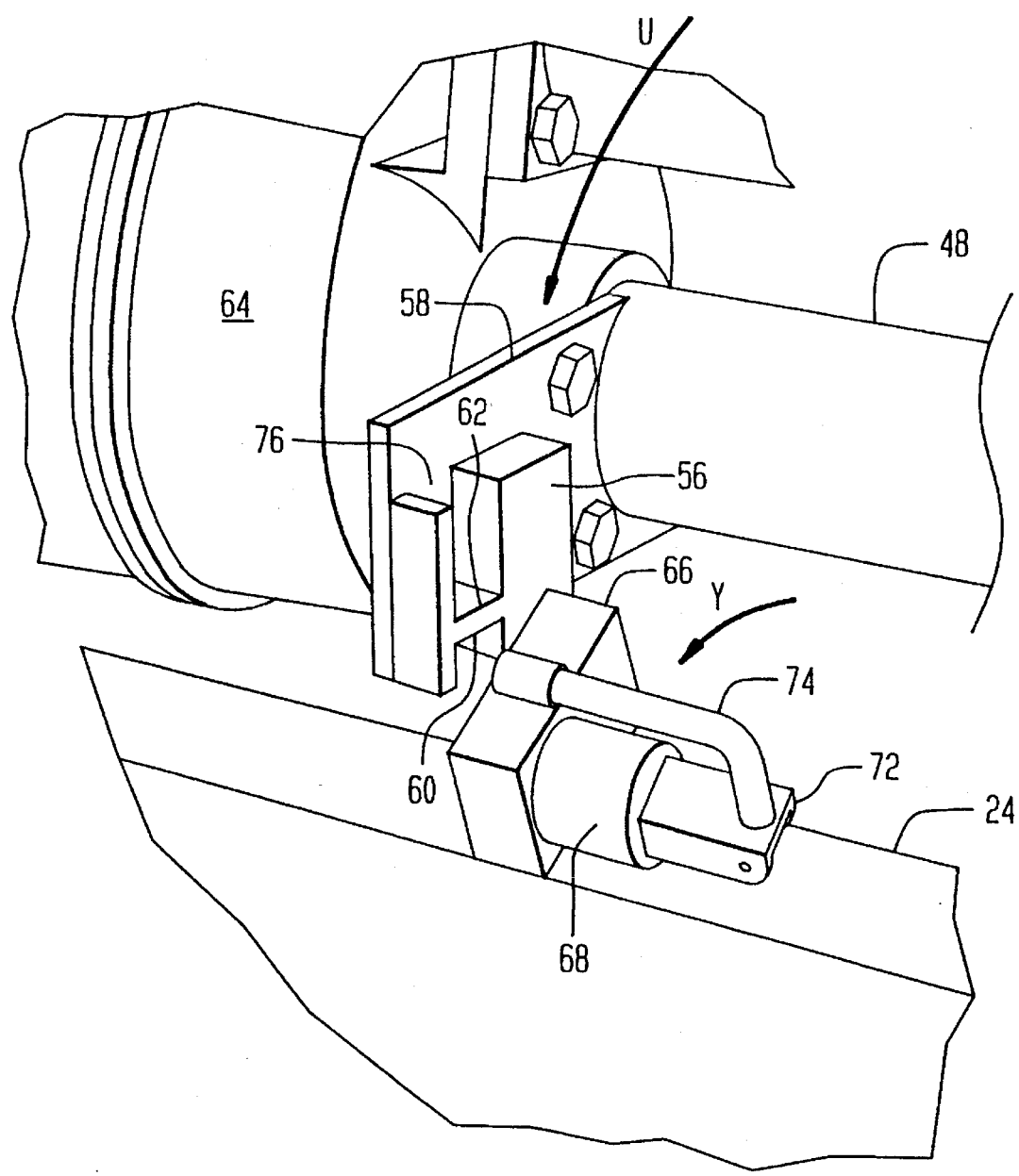
FIG. 9 is another enlarged perspective view of FIG. 8.

Referring additionally to FIGS. 7 to 12, the assembly sequence between the frame 24 and the rear drive assembly 22 and the associated structure which facilitates the present invention will be now further described. An automatically engagable locking assembly or mechanism is shown generally at numeral 26 in FIG. 10 in its fully engaged position. This locking assembly includes the latch plate 56 secured by plate 58 to drive gear housing 64 as previously described. The locking assembly 26 also includes a laterally extendable spring loaded bolt 70 seen in FIGS. 7 and 8 mounted for slidable in and out translation within cylindrical housing 68 which also houses a compression spring for biasing the bolt 70 outwardly as shown in FIGS. 7 and 8. Bolt releasing handle 74 acting through cam plate 72 regulates the extended/withdrawn position of bolt 70. Mounting block 66 secures this arrangement to frame member 24.

The frame 24 further includes diagonal frame extensions 42 which upwardly and rearwardly extend from longitudinal frame members 30. Diagonally downwardly disposed from these frame extensions 42 are spaced tubular guides 44 and 46 which define a downwardly and rearwardly facing opening sized to snugly receive drive shaft housing 48 therewithin as shown. To effect this positioning, the rear of the frame 24 is lowered in the direction of arrow V as seen in FIG. 6. This is accomplished with the rear drive assembly 22 positioned in an at-rest position atop the ground or a flat surface as shown in FIG. 7. After effecting initial engagement between the rear of frame 24 and the rear drive assembly 22 as depicted in FIG. 7, tubular handle 52 is lifted rotationally about drive shaft housing 48 in the direction of arrow U through approximately 90° to an upright orientation. With the bolt 70 positioned outwardly in its engagable position shown in FIGS. 7 and 8, the lower contoured surface 60 of latch plate 56 will strike the upwardly facing arcuate surface of bolt 70 as it passes thereby into a fully engaged position, after which bolt 70, would biasingly spring outwardly again to engage against locking surface 62 of latch plate 56.

Figure 10:
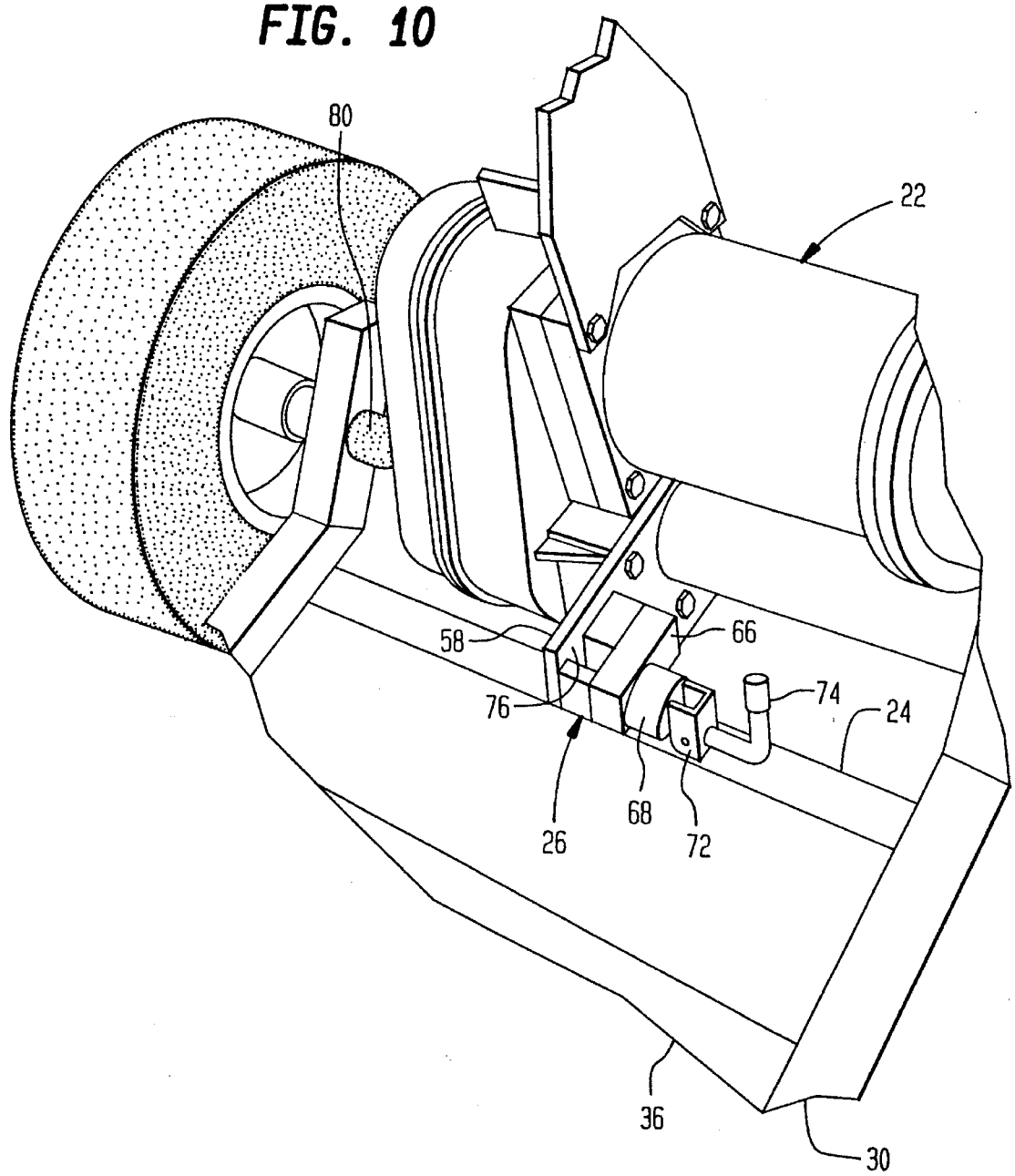
FIG. 10 is a perspective view of the invention shown in FIG. 7 in a fully engaged configuration.

As may now be appreciated, the downwardly and rearwardly facing opening defined by guide members 44, 46 and frame extension 42, aided by the weight of gravity of the rear of frame 24, will positively secure the arrangement of components shown in FIG. 7. The user is then free to one-handedly lift handle 52 as shown in FIG. 8 toward the locked orientation of this arrangement as shown in FIG. 10.

To establish proper lateral positioning between the rear of frame 24 and the rear drive assembly 22, a nylon alignment plate 80 secured to the right hand frame extension 42 is also provided. As best seen in FIGS. 7, 8 and 10, this alignment plate 80, having a rounded distal surface, interengages at 82 against drive gear housing 64. When so aligned, the mating surfaces between latch plate 56 and support block 66 are accurately established.

Figure 11:
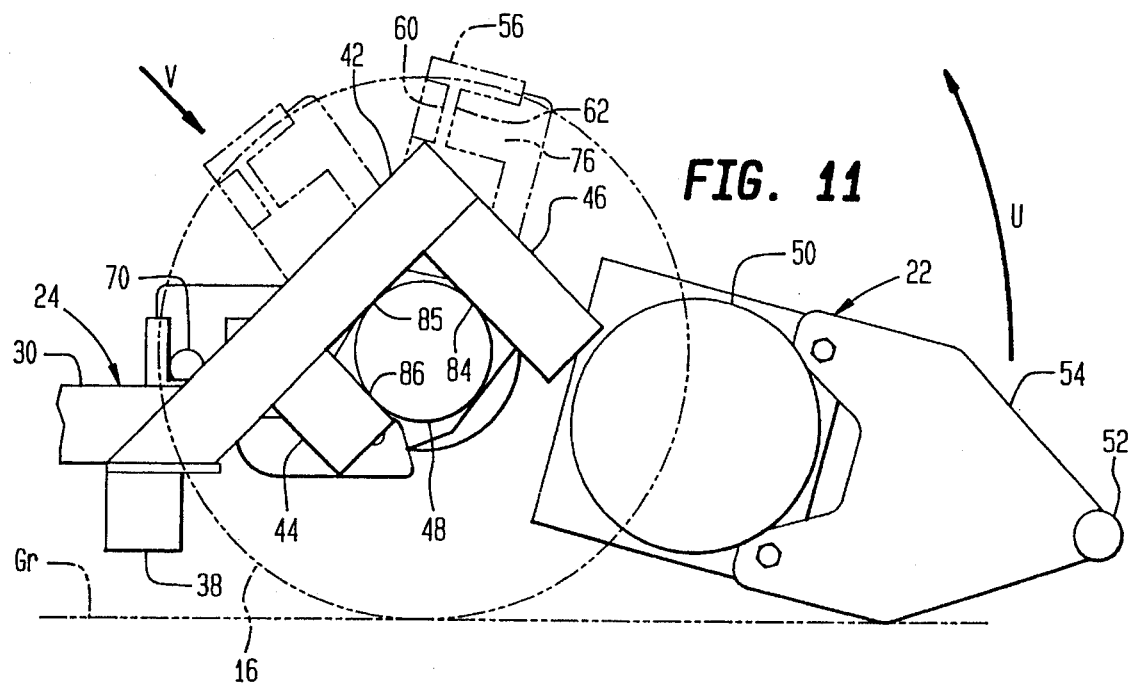
FIG. 11 is a side elevation schematic view of FIG. 7 depicting rotation of the rear drive assembly in phantom.
Figure 12:
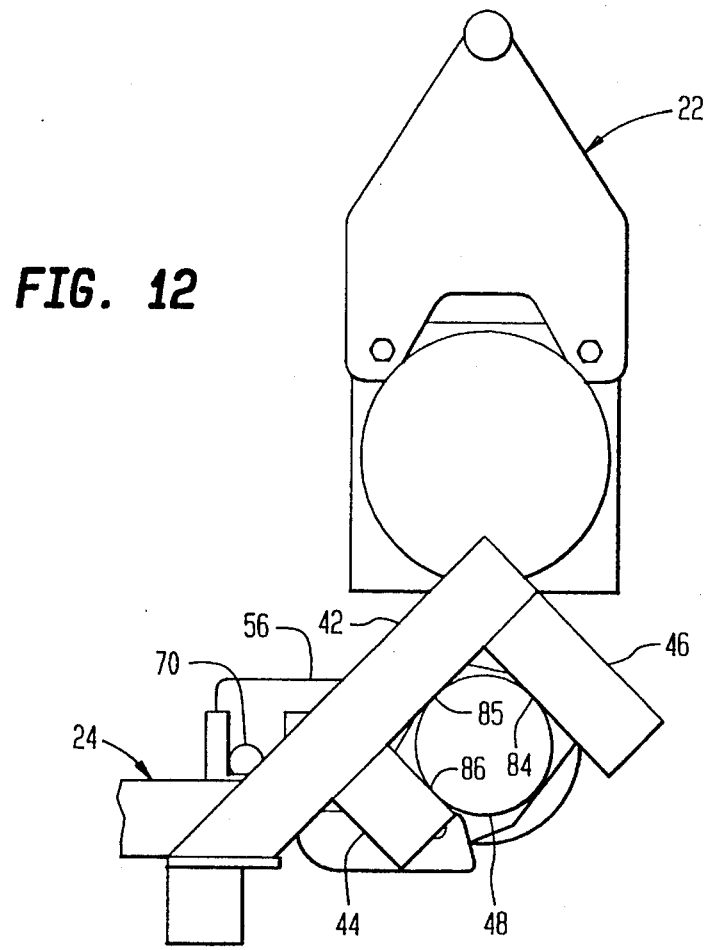
FIG. 12 is a side elevation schematic view of FIG. 10.

For further clarification, refer to FIGS. 11 and 12 wherein the invention is depicted schematically. In FIG. 11, the rear drive assembly 22 is positioned in an at-rest independent orientation atop the ground GR. After the rear of frame 24 has been lowered diagonally downwardly and rearwardly in the direction of arrow V after being manually lifted, surfaces 84, 85 and 86 contact against the drive shaft housing 48 and, aided by the weight of gravity of frame 24, prevent relative movement therebetween, except for the rotational assembly motion in the direction of arrow U of the rear drive assembly 22.

Of course, it should be understood that the shape of the rearwardly and downwardly opening defined by frame extension 42 and guide members 44 and 46 may vary significantly and remain within the scope of this invention. The important concept is in providing the fully stabilizing downwardly and rearwardly opening for engagement with drive shaft housing 48, so that aided by gravity, the entire arrangement is stabilized for final rotational assembly in the direction of arrow U.

Note that during operation, the locking bolt 70 is lightly loaded while areas 84, 85 and 86 of FIG. 12 absorb driving and weight-bearing loads.

While the instant invention has been shown and described herein in what are conceived to be the most practical and preferred embodiments, it is recognized that departures may be made therefrom within the scope of the invention, which is therefore not to be limited to the details disclosed herein, but is to be afforded the full scope of the claims so as to embrace any and all equivalent apparatus and articles.

What is claimed is:

1. A frame for a self-propelled personal mobility vehicle comprising:

a front frame section having a generally upright mount for supporting a steerable front wheel;

a pair of spaced longitudinal frame members extending rearwardly from said front frame section and connected rearwardly thereof by a transverse rear cross member;

a pair of spaced straight diagonal frame extensions each connected to and rearwardly and upwardly extending from a rearward portion of said frame, each said frame extension having two straight parallel spaced side legs connected thereto, and orthogonally extending therefrom spaced apart to closely receive a tubular drive shaft housing of a drive means of said vehicle;

said drive shaft housing only supportedly engaging against opposing contact points on said side legs and a contact point centrally on said frame extension generally equidistant from said side leg contact points;

locking means connected to said frame rearward portion for releasable engagement with a latch plate means connected to said drive means.

2. A frame for a self-propelled personal mobility vehicle as set forth in claim 1, further comprising:

lateral alignment means positioned between said frame and said drive means for establishing and maintaining relative lateral positioning therebetween and for maintaining engagement of said locking means during assembly and use of said vehicle.

3. A method of assembling a dismantled self-propelled personal mobility vehicle which comprises a frame having a steerable front wheel operably connected to a front portion of said frame and a separate drive means having a drive gear housing with a tubular drive shaft housing extending transversely therefrom, said drive shaft housing having a rear support wheel operably connected at each end thereof, said frame further including a pair of spaced coupling members each consisting of a straight frame extension connected to, and diagonally extending upwardly and rearwardly from a rearward portion of said frame and having two spaced parallel side legs connected to, and orthogonally extending downwardly and rearwardly from said frame extension to receive and contact against said drive shaft housing, said drive shaft housing only supportedly engaging against opposing contact points on said side legs and a contact point centrally on said frame extension generally equidistant from said side leg contact points, and a locking means connected to said frame rearward portion for releasable engagement with a latch plate means connected to said drive means, said method consisting essentially of the steps of:

A. positioning said drive means atop a flat surface resting on said rear wheels with said latch plate means upwardly disposed;

B. positioning said frame atop the flat surface resting on said front wheel and manually supported at said frame rearward portion above the flat surface such that said coupling members are positioned above and aligned with said drive shaft housing;

C. lowering said frame rearward portion diagonally downwardly and rearwardly whereby said coupling members engage around and are supported on said drive shaft housing, said drive means being prevented by said coupling members from all but rotational movement therebetween;

D. rotating said drive means about said drive shaft housing an arcuate distance of about one quarter of a turn being sufficient for said latch plate means to lockably engage with said locking means.

\* \* \* \* \*